United States Patent [19]
Kanbar

[11] Patent Number: 5,604,548
[45] Date of Patent: Feb. 18, 1997

[54] EMERGENCY LORGNETTE

[76] Inventor: Maurice S. Kanbar, 2140 Pacific Ave., Apt. #503, San Francisco, Calif. 94115

[21] Appl. No.: 644,218

[22] Filed: May 10, 1996

[51] Int. Cl.$^6$ .............................. G02C 3/04; G02C 7/08
[52] U.S. Cl. .................. 351/56; 351/41; 351/57
[58] Field of Search .................. 351/41, 54, 56, 351/57

[56] References Cited

U.S. PATENT DOCUMENTS 5,110,197  5/1992  Arad ......................................... 351/41

*Primary Examiner*—Huy Mai
*Attorney, Agent, or Firm*—Michael Ebert

[57] ABSTRACT

An emergency lorgnette making it possible for a user having defective eyesight to see reasonably well regardless of the nature of the defect. The lorgnette is molded of transparent synthetic plastic material to define a strip having formed at one end thereof a handle and along its length in alignment with the upper edge of the strip, first and second pairs of lenses in staggered relation, whereby the left eye lenses of the two pairs which are adjacent each other are spaced from the right eye lenses of the two pairs which are adjacent each other. Indented in the lower edge of the strip are first and second notches, each of which is adapted to receive the bridge of the user's nose when the lorgnette is held by its handle adjacent the eyes of the user. The first notch is placed midway between the left and right eye lenses of the first pair, the second notch being placed midway between the left and right eye lenses of the second pair. The lenses of the first pair have a high diopter and those of the second pair, a relatively low diopter. Hence when using the lorgnette, the user selects a notch aligning that pair of lenses with his eyes which affords the best optical accommodation to the reading matter or object being viewed.

7 Claims, 1 Drawing Sheet

FIG. 1
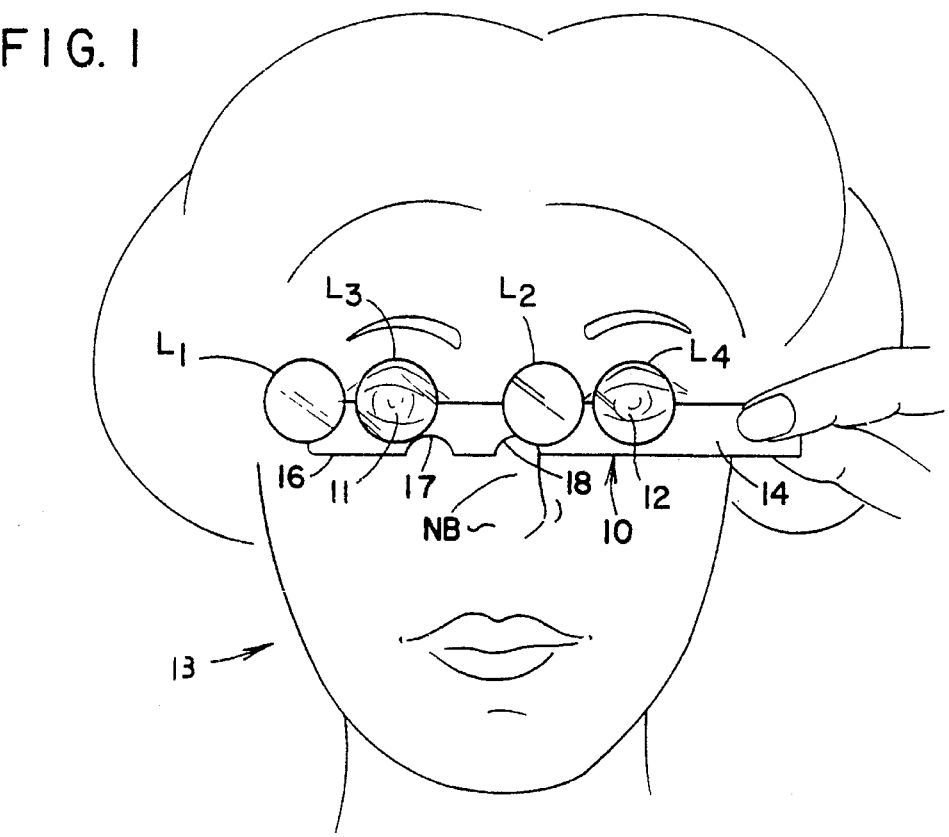
FIG. 2
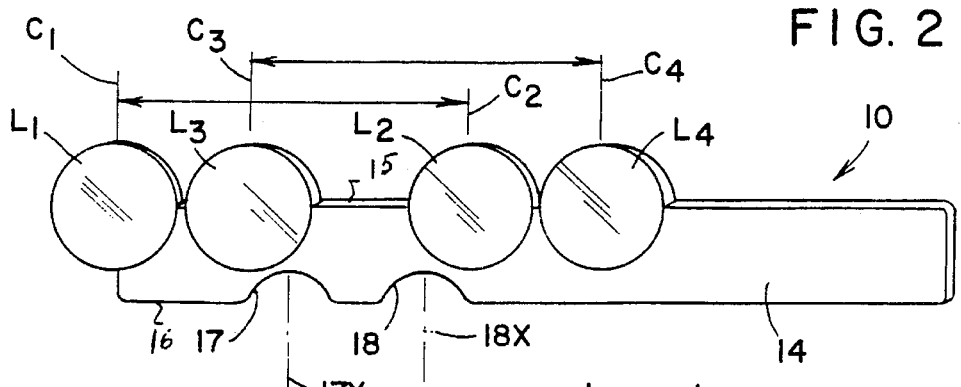
FIG. 3
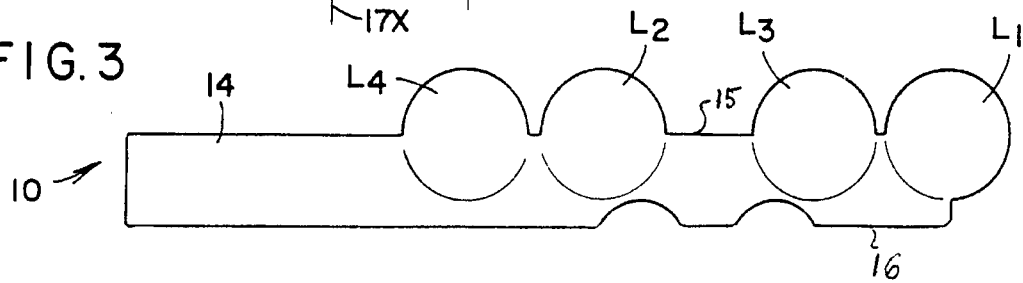
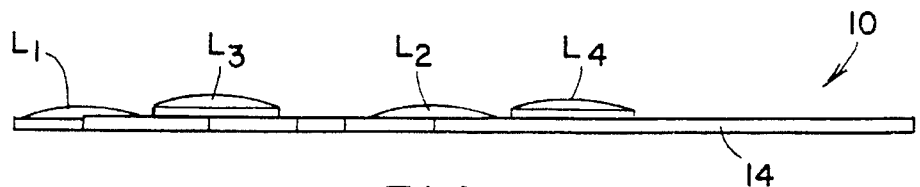
FIG. 4

EMERGENCY LORGNETTE

BACKGROUND OF INVENTION

1. Field of Invention

This invention relates generally to lorgnettes which when held by a user having defective vision before his eyes, then improves the user's vision, and more particularly to an emergency lorgnette for this purpose having two pairs of lenses of different optical power, the user selecting that pair which best accommodates his eyes to the reading matter or the object being viewed.

2. Status of Prior Art

The Kanbar U.S. Pat. No. 3,876,294 discloses a lensless ophthalmic device serving as a temporary or emergency substitute for any type of prescription eyeglasses, making it possible for most individuals having defective sight, without regard to the optical nature of the defect, to see more clearly. The device is constituted by a molded plate having a profile defining a pair of eyepieces joined to a nose piece, each eyepiece having a pattern of pin holes therein adapted to project a clear image of the object viewed on the related eye of the wearer. The spacings between holes in the pattern is such that when the plate is placed against the eyes, the eye is unable to resolve the hole pattern and the holes in each eyepiece appear to merge to form one large opening.

The drawback of a lensless device of the type shown in my prior patent is that what the viewer sees is observed through a pin hole grid that substantially reduces the amount of light received by the eyes. This makes it difficult to see under dim light conditions.

An individual whose eyesight is defective, can achieve the optimum degree of correction by using eyeglasses whose lenses are prescribed to correct for myopia (nearsightedness), hyperopia (farsightedness), astigmatism or whatever other visual disorder requires corrections.

The lenses of prescription spectacles, when serving to correct the focus of the eye for near and far distances are convex. The diopter of a convex lens is the measure of its power and this offers a simple method for prescribing spectacles appropriate to the defect to be corrected.

Those who suffer from defective eyesight and have to wear prescription eyeglasses to see more clearly are often rendered helpless if the eyeglasses are misplaced or broken. But in many instances as a matter of personal vanity, a woman having defective eyesight will not when going to a restaurant or to any other place away from home, bring along her spectacles, for wearing spectacles is regarded as unglamorous. This presents a problem, for when dining in a fashionable restaurant, this woman must consult a menu, and without her prescription glasses she may be unable to do so.

While the pinhole lorgnette of the type disclosed in the above-identified Kanbar patent, makes it possible for an individual having defective vision to read a menu, should the restaurant be dimly lit, as is often the case, the loss of light produced by the pinholes makes it difficult to then read the menu. The same problem is experienced when this individual wishes to consult a telephone directory or to read any other printed text under poor light conditions.

Design Pat. No. Design 206,910 to Lueddike shows a one piece lorgnette formed of transparent material having a pair of convex lenses. While this design patent does not indicate how this pair of lenses correct the wearer's visual defect, should these lenses be prescription lenses, they would be useable only by the individual for whom the lorgnette is prescribed.

The Avad U.S. Pat. No. 5,037,192 discloses an emergency eyeglass formed of a flat clear plastic plate of credit card size molded to define a pair of optical lenses "having diopter power", the card having a cut out between the lenses to accommodate the nose of the user. The Avad device is intended for use by an individual in an emergency situation in which the individual does not have his prescription eyeglasses available.

While Avad does not identify the diopter power of the lenses, whatever power they may have, this will render these lenses corrective only for some visual defects, but not for others. Hence many individuals will not be able to see more clearly when using the Avad device. For example, the Avad device may be effective when the individual using it is near-sighted, but may be much less effective if the individual is farsighted.

SUMMARY OF INVENTION

In view of the foregoing, the main object of this invention is to provide an emergency lorgnette useable by any individual whose eyesight is defective, regardless of the nature of the defect.

More specifically, an object of this invention is to provide a lorgnette having two pairs of lenses, whereby the user is able to select for use that pair which affords the greatest degree of correction for his defective vision.

A lorgnette in accordance with the invention is optically similar is some respects to a reading glass in which a large magnifying lens is attached to a handle to facilitate the reading of fine print or map details. However, instead of a large magnifying lens, a lorgnette in accordance with the invention includes two pairs of lenses, each affording a different degree of magnification, each pair having left and right eye lenses to bring reading matter in focus in both eyes of the user.

Also an object of the invention is to provide an emergency lorgnette which is virtually indestructable, yet may be mass produced at low cost.

Briefly stated, these objects are attainable by an emergency lorgnette making it possible for a user having defective eyesight to see reasonably well regardless of the nature of the defect. The lorgnette is molded of transparent synthetic plastic material to define a strip having formed at one end thereof a handle and along its length in alignment with the upper edge of the strip first and second pairs of lenses in staggered relation, whereby the left eye lenses of the two pairs which are adjacent each other are spaced from the right eye lenses of the two pairs which are adjacent each other.

Indented in the lower edge of the strip are first and second notches, each of which is adapted to receive the bridge of the user's nose when the lorgnette is held by its handle adjacent the eyes of the user. The first notch is placed midway between the left and right eyes lenses of the first pair, the second notch being placed midway between the left and right eye lenses of the second pair. The lenses of the first pair have a high diopter and those of the second pair a relatively low diopter. Hence when using the lorgnette, the user selects a notch which aligns that pair of lenses with his eyes affording the best optical accommodation to the reading matter object being viewed.

BRIEF DESCRIPTION OF DRAWINGS

For a better understanding of the invention, as well as further features thereof, reference is made to the detailed description thereof to be read in connection with the annexed drawings wherein:

FIG. 1 shows an emergency lorgnette in accordance with the invention held before the eyes of a user;

FIG. 2 is a front face perspective view of the lorgnette.

FIG. 3 is a rear face view of the lorgnette; and

FIG. 4 is a top edge view of the lorgnette.

DESCRIPTION OF INVENTION

Referring now to FIG. 1, that is showing an emergency lorgnette 10 in accordance with the invention held by its handle before the eyes 11 and 12 of a user 13 who has a defective vision and therefore has difficulty in reading a menu or other printed matter.

As best seen in FIGS. 2, 3 and 4, lorgnette 10 is molded of a transparent synthetic plastic material of high clarity and good mechanical strength, such as styrene or acrylic plastic material to define an elongated generally rectangular strip one end of which forms a handle 14. Molded along the length of the strip in alignment with the upper edge of the strip are first and second pairs of convex lenses $L_1$–$L_2$ and $L_3$–$L_4$ in staggered relation.

The staggered relationship is such that the left-eye lenses $L_1$ and $L_3$ of the two pairs are adjacent each other on the end of the strip opposed to the handle end, and are spaced by the right eye lenses $L_2$ and $L_4$ of the two pairs which are adjacent each other next to the handle 14. The centers of all four lenses $L_1$ to $L_4$ which are circular in shape are coincident with the upper edge 15 of the strip.

Indented in the lower edge 16 of the strip is a notch 17 placed midway between the centers of the left and right eye lenses $L_1$ and $L_2$ of the first pair. Thus as shown in FIG. 2, the center axis 17x of notch 17 is midway between the centers $C_1$ and $C_2$ of lenses $L_1$ and $L_2$ of the first pair. Hence when the nose bridge of the user of the lorgnette is received in notch 17, the left and right eyes 11 and 12 of the user are then aligned with the left and right eye lenses $L_1$ and $L_2$ of the first pair, and the user sees through these lenses.

Also indented in the lower edge 16 of the strip is a second nose bridge notch 18 placed midway between the centers $C_1$ and $C_2$ of the left and right eye lenses $L_3$ and $L_4$ of the second pair. This is shown in FIG. 2 where it will be seen that the center axis 18x of notch 18 is midway between the centers $C_3$ and $C_4$ of lenses $L_3$ and $L_4$ of the second pair. When therefore as shown in FIG. 1, the nose bridge NB of the user is received in notch 18, his left and right eyes 11 and 12 are then aligned with the left and right eye lenses. $L_3$ and $L_4$ of the second pair.

The lenses of the first pair have a low diopter, such as 1.75, while that of the second pair have a relatively high diopter, such as 3.25. Hence the first pair affords a lower degree of optical magnification than the lenses of the second pair.

In practice, therefore, a user of the lorgnette who has defective eyesight and seeks to read a menu or other printed matter which the individual finds difficult to read, chooses that notch in the lorgnette which for his or her defective eyes, renders the menu more readable.

While an emergency lorgnette in accordance with the invention is adapted to facilitate reading, it may also be designed optically to facilitate general viewing. For that purpose the first pair of lenses will have a diopter appropriate to farsighted individuals generally, and the second pair will have a diopter appropriate to nearsighted individuals generally. Since those who suffer from defective vision are largely either nearsighted or farsighted, the user of the lorgnette will select the pair of lenses which best serves his needs.

The emergency lorgnette is not designed to correct the defective vision of a particular individual, and therefore does not afford the exact degree of necessary correction. However, for emergency purposes the lorgnette supplies sufficient correction to significantly improve the vision of the user.

In molding the lorgnette, the convexity of lenses $L_1$ to $L_4$ depends on their diopter, the lenses projecting from the front face of the strip as shown in FIG. 4. The convexity of the lenses in FIG. 4 is exaggerated, for in an actual lorgnette the bulge may be slight. But the rear face of the strip is flat, as shown in FIG. 3, and when the lorgnette is put to use, the flat face therefore is adjacent the eyes of the user.

Because the lorgnette is molded of high-strength synthetic plastic material, it is inexpensive to make on a mass production basis. The low cost of-the lorgnette makes it disposable, for once the lorgnette is put to use by a particular individual who brings the lorgnette close to his eyes, it is not thereafter desireable that the same lorgnette which is no longer sterile, be used by another individual. But the same individual can continue to use the lorgnette, and to clean it when necessary. It is also desireable that all corners of the lorgnette be rounded to avoid sharp edges.

While there has been shown a preferred embodiment of an emergency lorgnette, in accordance with the invention, it will be appreciated that many changes may be made thereon without departing from the spirit of the invention.

I claim:

1. An emergency lorgnette making it possible for a user having defective vision to see an object such as a menu more clearly regardless of the nature of the defect, said lorgnette comprising:

A. an elongated strip having an upper edge and a lower edge, said strip having a handle formed at one end thereof and having formed along its length in alignment with the upper edge first and second pairs of left and right eye lenses in staggered relation whereby the left eye lenses of the two pairs are adjacent each other and are spaced from the right eye lenses of the two pairs which are adjacent each other, the lenses of the second pair having a higher degree of optical magnification than those of the first pair;

B. a first notch intended in the lower edge of the strip midway between the lenses of the first pair to receive the nose bridge of the user whereby when the user selects this notch for use, his eyes are then aligned with the lenses of this pair; and C. a second notch indented in the lower edge of the strip midway between the lenses of the second pair to receive the nose bridge of the user whereby when the user selects this notch, his eyes are then aligned with the lenses of this pair, the user selecting the notch which best optically accommodates his vision to the object being viewed.

2. A lorgnette as set forth in claim 1, in which the lenses of the first pair provide a lower diopter magnification than those of the second pair, the user selecting that pair which brings reading matter into focus.

3. A lorgnette as set forth in claim 2, in which the lenses of the first pair have a diopter of about 1.75 and that of the second pair a diopter of about 3.25.

4. A lorgnette as set forth in claim 1, in which the lorgnette is molded of a single piece of transparent synthetic plastic material.

5. A lorgnette as set forth in claim 1, in which the plastic material is styrene.

6. A lorgnette as set forth in claim 1, in which the lenses are convex lenses and the center of each lens is coincident with the upper edge of the strip.

7. A lorgnette as set forth in claim 6, in which the convex lens projects from the front face of the strip whose rear face is flat.

* * * * *